May 21, 1968     E. J. POLLEY, JR     3,384,389
COMBINATION KICKSTAND AND FOOTREST FOR MOTORCYCLES
Filed Nov. 1, 1967
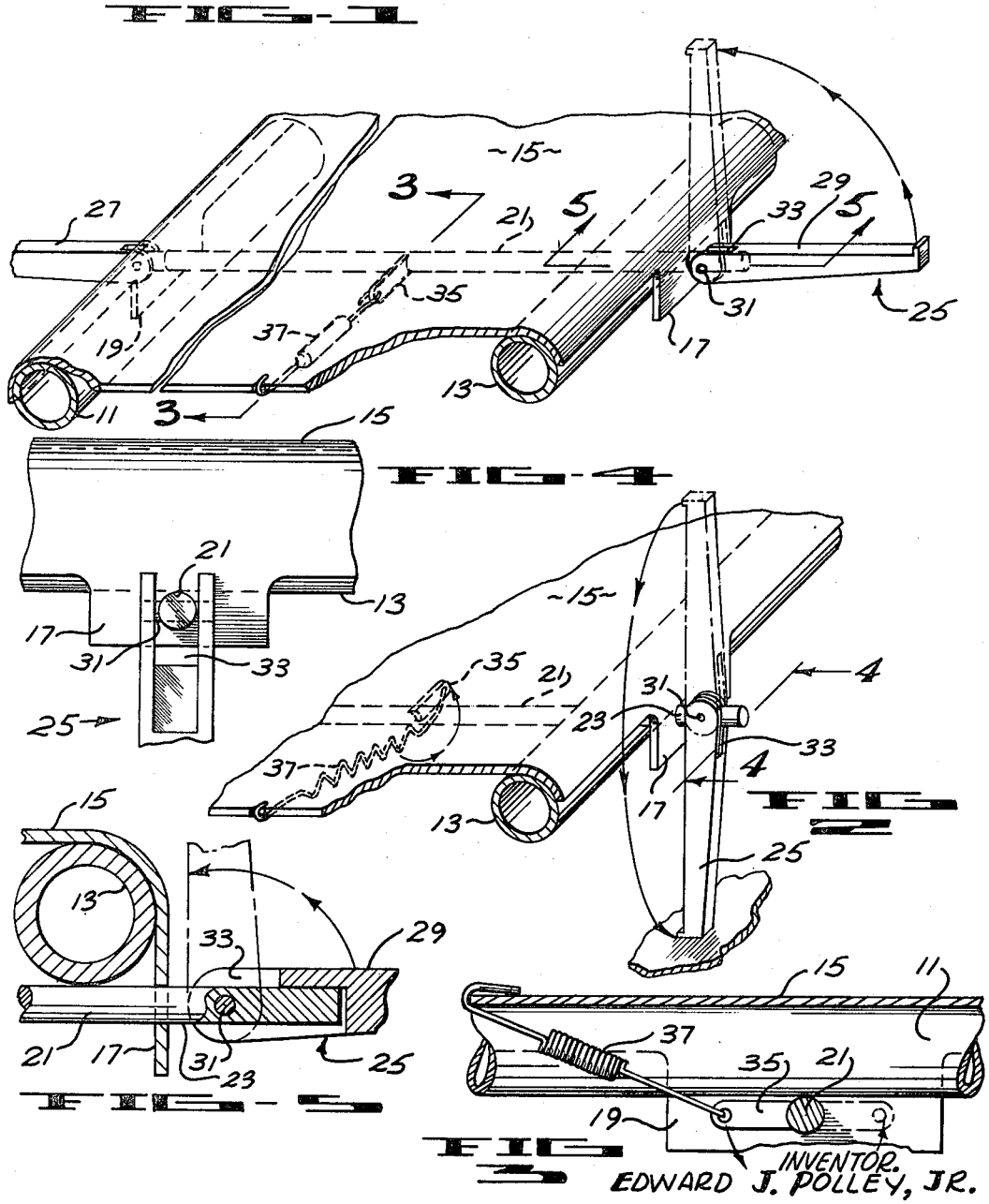
INVENTOR.
EDWARD J. POLLEY, JR.
BY
Sokolski & Wohlgemuth
ATTORNEYS United States Patent Office 3,384,389
Patented May 21, 1968

3,384,389
COMBINATION KICKSTAND AND FOOTREST
FOR MOTORCYCLES
Edward J. Polley, Jr., Inglewood, Calif., assignor to Nova Products of California, Inc., Gardena, Calif., a corporation of California
Filed Nov. 1, 1967, Ser. No. 679,679
10 Claims. (Cl. 280—295)

ABSTRACT OF THE DISCLOSURE

A combination footrest and kickstand for motorcycles, motorbikes and the like, which will extend from the base of the cycle in the conventional position for a footrest. In the footrest position the device extends parallel to the ground. When used as a kickstand, it is rotated to an upward vertical position and then roated 180° pointing downwardly. In rotating the device downwardly such that it points directly at the ground, it places a spring in tension with the drag of the ground resisting the return movement of the device to its upward position. Releasing the drag force of the ground relative to the device permits it to return to a vertical upward position so that it can once again be used as a footrest.

---

With the advent of interest in camping, the prominence of compact motorbikes and motorcycles has rapidly grown. It is important that these bikes be relatively compact, and they should be readily disassembled to fit in the trunk or on top of a car or in trailer. Additionally, it is important that their construction be simplified so that repairs can be easily made, so that they are lightweight, and, often of great importance, low in cost. Thus it is desirable to combine functions of elements where possible. Prior to the herein invention, motorcycles and motorbikes had separate foot rests and kickstands. In lightweight bikes, the footrests are normally bars which extend outwardly from the frame at the bottom portion thereof normally located underneath or adjacent the motor. The kickstand normally is a separate element which in some designs is spring-loaded so that it will automatically return to a rest position when the drag of the ground against it is alleviated. However, previous to the herein invention there has not been combined the features of the kickstand together with a footrest which is both collapsible and automatically retractable.

Thus, it is an object of this invention to provide a combination kickstand-footrest for motorcycles and motorbikes.

A further object of this invention is to provide a footrest and kickstand combination for motorcycles and motorbikes which is collapsible when it is desired to store the bike in closely confined spaces.

Still another object of this invention is to provide a dual kickstand and footrest combination, with the footrest and kickstand extending from each side of the frame of a motorbike or motorcycle.

The above and other objects of this invention are accomplished by the herein device which is comprised of a rotatable axle mounted on the bottom portion of the frame of a motorcycle or motorbike and mounted essentially parallel to the axis of the rear wheel of the bike. Attached to each end of the axle and extending outwardly from the bike is the footrest/kickstand combination. The footrests/kickstands are each pivotally connected to the axle such that they can pivot from a position vertically upward from the ground to one extending parallel to the ground wherein they would serve as footrests. A spring is affixed between the frame of the motorbike and an attachment point connected to the axle at approximately the midpoint of the axle. To convert the footrest to kickstand function, the footrest is rotated 180° to a vertically downward position so as to place the spring in tension, since the axle is forced to turn together with the kickstand placing the spring in tension. The drag resistance of the ground prevents the spring from returning the kickstand to an upward vertical position. Upon releasing this drag force, such as slightly moving the bike in an appropriate direction, the kickstand will automatically return to its vertical upward position due to the action of the spring upon the axle. Then the kickstand/footrest elements are moved downwardly to their outward position where they are used for footrests. It is believed the invention will be better understood from the following detailed description in which:

FIG. 1 is a pictorial representation of the kickstand footrest of this invention, showing the device in a position where it is used as a footrest.

FIG. 2 is a pictorial representation of the device of this invention showing particularly the rotation from an upward vertical position to a downward position where it is used as a kickstand.

FIG. 3 is taken along line 3—3 of FIG. 1.
FIG. 4 is taken along line 4—4 of FIG. 2.
FIG. 5 is taken along line 5—5 of FIG. 1.

Referring now to FIGS. 1, 4 and 5, there is seen a typical bike frame comprised of tubular members 11 and 13 which run along the bottom of the bike, supporting an engine mounting plate 15 therebetween. As shown in this specific embodiment, the engine mounting plate 15 is wrapped around the tubular frame members 11 and 13 such that side tab portions 17 and 19 extend downwardly normal to the top surface of the plate. The tab portions 17 and 19 are provided with apertures through which pass azle 21. Axle 21 extends through the tab portion 17 at 23, terminating outwardly from the frame members of the device. The footrest/kickstand combinations 25 and 27 are shown extending outwardly parallel to the axle 21, wherein they serve as footrests for the rider of the bike. The footrests are shown as rectangularly shaped castings having a top surface 29 on which rests the foot of the rider.

The footrests 25 and 27 are pivotally connected to the axle 21 by pin 31 which passes through the axle 21 and is fixedly secured to the sidewalls of the footrest. The portion 23 of the axle 21 extends outwardly into the footrest 25 such that in the footrest position, the top surface 29 of the footrest resides on the portion 23 preventing further downward movement. A portion 33 of the top surface 29 of the footrest is recessed so that the element can pivot to the upward dotted position. It is obviously important that the portion 23 of the axle extend past the recess 33 so as to afford the aforementioned support for the device. The footrest can be raised to the upward position, either by utilizing the foot, or the driver can reach down with his hands and lift the footrest to the up position. It should be obvious that the rectangularly shaped footrest 25, which can for example be of aluminum casting, can be covered with a round rubber cover to serve as a footrest if so desired. In fact, it is apparent that it is not mandatory that the footrest be rectangularly shaped. Other configurations could serve the purpose of the herein invention.

When the kickstand is in the vertical upright position as shown in dotted outline in FIG. 1, it is then ready for rotation to a downward position as shown in FIG. 2. This rotation can be effected by either hand or foot movement. By rotating either of the footrests 25 and 27 downwardly, the opposite one will also rotate since they are both affixed to axle 21 and rotate therewith. At approximately the midportion of the axle, there is disposed a stopbar 35, rigidly affixed to the axle as additionally seen in FIG. 3. When the footrests/kickstands 25 and 27 are in the extended position of FIG. 1, utilized as footrests, the stopbar 35 is fixed to a spring 37 which spring is connected at its other end to the plate 15 such that the spring is in a relaxed position. In other words, the stopbar 35 is pointed or directed toward the spring 37. When the footrest/kickstand is rotated to a downward position as shown in FIG. 2, the stop 35 is moved 180° about the axle, placing the spring in compression. When the stop 35 strikes the plate in its further extended position as seen in FIGS. 2 and 3, movement of the kickstands 25 and 27 is then limited.

As can be seen, in order to effect the rotation of the stop 35 placing the spring 37 in tension, the kickstand and axle must be rotated in a direction toward the spring. Thus, it makes no difference in which direction the spring is fastened to the plate 15. In practical applications it has been found that the spring 37 is best directed toward the front of the bike, so that the downward movement of the kickstand occurs by rotating it forward toward the front of the bike. In the downward position of the kickstand, as shown in FIG. 2, the ground on which the kickstand is resting serves as sufficient drag together with the front wheel of the device to prevent any movement off of the kickstand. The dual nature of the kickstand further serves as better support for the bike, preventing its accidentally tipping over. To release the kickstands, one would force the bike in a direction opposite of the spring 37, which would release the drag on the kickstands, allowing the spring 37 to force a return to the upward position. In other words, if the spring 37 is affixed toward the front of the bike, the rider would merely sit on the bike and rock it backwardly, allowing the kickstand to become free and rotate to the upward position.

While the device of this invention has been described and illustrated in detail, it is to be clearly understood that this is intended by way of illustration and example only and is not to be taken by way of limitation, the spirit and scope of this invention being limited only by the terms of the following claims.

I claim:
1. A kickstand/footrest combination device for motorcycles and motorbikes comprising:
   a rotatable axle supported on the bottom of said motorcycle extending from each side thereof,
   combination footrest/kickstand members pivotally connected to each end of said axle, so as to pivot from a horizontal footrest position to a vertically upward position, said members being rotatable with said axle to a downward kickstand position,
   means for locking said footrest/kickstand members in a horizontal footrest position extending from said axle to prevent downward movement when pressure is exerted thereon.
2. The device of claim 1 further comprising:
   means for automatically returning said footrest/kickstand members from a downward vertical kickstand position relative to said axle to an upward vertical position whereby said elements can be pivoted to a horizontal footrest position.
3. The device of claim 2 wherein said means for returning said footrest/kickstand members comprises:
   a spring having one end connected in a fixed position to said motorcycle,
   the opposite end of said spring being affixed to said axle whereby said spring is in tension when said element is in a vertically downward kickstand position.
4. The device of claim 3 wherein
   said spring is connected to a protrusion from said axle which cooperatively acts with said motorcycle to limit the rotation of said axle.
5. The device of claim 1 wherein said locking means comprises:
   said footrest member pivotally connected to said axle such that in said horizontal position said member rests on the extending portion of said axle.
6. In combination:
   a motorcycle having a bottom frame member and a footrest/kickstand supported by said frame comprising:
   a rotatable axle supported by said frame and extending from each side of said motorcycle,
   combination footrest/kickstand members pivotally connected to each end of said axle, so as to pivot from a horizontal footrest position to a vertically upward position, said members being rotatable with said axle to a downward kickstand position,
   means for locking said footrest/kickstand members in a horizontal footrest position extending from said axle to prevent downward movement when pressure is exerted thereon.
7. The device of claim 6 further comprising:
   means for automatically returning said footrest/kickstand members from a downward vertical kickstand position relative to said axle to an upward vertical position whereby said elements can be pivoted to a horizontal footrest position.
8. The device of claim 7 wherein said means for returning said footrest/kickstand member comprises:
   a spring having one end connected in a fixed position on said motorcycle,
   the opposite end of said spring being affixed to said axle whereby said spring is in tension when said element is in a vertically downward kickstand position.
9. The device of claim 8 wherein
   said spring is connected to a protrusion from said axle which cooperatively acts with said motorcycle to limit the rotation of said axle.
10. The device of claim 6 wherein said locking means comprises:
    said footrest member pivotally connected to said axle such that in said horizontal position said member rests on the extending portion of said axle.

References Cited

UNITED STATES PATENTS

| 640,381 | 1/1900 | Hart | 280—294 |
| 1,172,465 | 2/1916 | Knapp | 280—302 |
| 1,435,625 | 11/1922 | Schwinn | 280—301 |
| 1,643,006 | 9/1927 | Driscoll | 280—302 |
| 1,654,862 | 1/1928 | Clyne | 280—302 |
| 2,791,441 | 5/1957 | Phillips | 280—302 |
| 2,861,815 | 11/1958 | Willinger | 280—278 |
| 3,039,792 | 6/1962 | Wood et al. | 280—302 |

FOREIGN PATENTS

| 800,528 | 11/1950 | Germany. |

KENNETH H. BETTS, *Primary Examiner.*